United States Patent
Vasselli et al.

(10) Patent No.: US 11,250,143 B2
(45) Date of Patent: *Feb. 15, 2022

(54) METHOD AND SYSTEM FOR IMPLEMENTING AN ENCRYPTION SDK

(71) Applicant: Box, Inc., Redwood City, CA (US)

(72) Inventors: Christopher Vasselli, Putney, VT (US); Irving Yunchi Ruan, Mountain View, CA (US)

(73) Assignee: Box, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/947,619

(22) Filed: Aug. 10, 2020

(65) Prior Publication Data

US 2021/0026972 A1 Jan. 28, 2021

Related U.S. Application Data (63) Continuation of application No. 15/950,885, filed on Apr. 11, 2018, now Pat. No. 10,740,473.

(51) Int. Cl.
*G06F 21/60* (2013.01)
*H04L 29/06* (2006.01)
(Continued)

(52) U.S. Cl.
CPC ............. *G06F 21/602* (2013.01); *G06F 9/54* (2013.01); *G06F 21/6218* (2013.01);
(Continued)

(58) Field of Classification Search
CPC .............. G06F 21/602; G06F 21/6281; G06F 21/6218; G06F 9/54; G06F 21/31;
(Continued)

(56) References Cited

U.S. PATENT DOCUMENTS 9,954,828 B1 4/2018 Chandrasekhar
2013/0238562 A1 9/2013 Kumarasamy
(Continued)

OTHER PUBLICATIONS

Joe Kissell, "How to use iCloud Keychain", Macworld.com, URL:https://www.macworld.com/article/2058081/how-to-use-icloud-keychain.html, Oct. 28, 2013.
(Continued)

*Primary Examiner* — Izunna Okeke
(74) *Attorney, Agent, or Firm* — Vista IP Law Group, LLP (57) ABSTRACT

Disclosed is an approach to implement a new layer of security within mobile devices using an encryption SDK, which implements a standalone component for applications to encrypt, decrypt, and view sensitive data on the device. A security layer is implemented on the device, wherein the security layer manages encryption for data retrieved onto the device from a cloud-based environment. Encrypted content is then generated at the security layer before storing the encrypted content by receiving the content object from the cloud-based environment and encrypting the content object with an encryption key that is password protected. The encrypted content is stored within an encrypted filesystem for presenting the content on the device.

17 Claims, 8 Drawing Sheets

Related U.S. Application Data (60) Provisional application No. 62/484,371, filed on Apr. 11, 2017.

(51) Int. Cl.

| | | |
|---|---|---|
| *G06F 21/62* | (2013.01) | |
| *G06F 9/54* | (2006.01) | |
| *H04L 9/32* | (2006.01) | |
| *H04L 9/08* | (2006.01) | |
| *G06F 21/31* | (2013.01) | |
| *G06F 8/20* | (2018.01) | |

(52) U.S. Cl.
CPC ........ *G06F 21/6281* (2013.01); *H04L 9/0894* (2013.01); *H04L 9/3226* (2013.01); *H04L 63/06* (2013.01); *G06F 8/20* (2013.01); *G06F 21/31* (2013.01); *H04L 2209/60* (2013.01)

(58) Field of Classification Search
CPC ..... H04L 9/0894; H04L 63/06; H04L 9/3226; H04L 2209/60
USPC .................... 713/153, 164, 191, 193; 726/12
See application file for complete search history.

(56) References Cited

U.S. PATENT DOCUMENTS

| | | | | |
|---|---|---|---|---|
| 2014/0122866 | A1* | 5/2014 | Haeger | ................ H04L 63/061 |
| | | | | 713/153 |
| 2017/0163429 | A1* | 6/2017 | Stuntebeck | ............... H04L 9/14 |

OTHER PUBLICATIONS

Sarah Guarino, "How-to: Setup and use iCloud Keychain for Mavericks and iOS 7", 9to5mac.com, URL:https://9to5mac.com/2013/10/26/how-to-setup-and-use-icloud-keychain-for-mavericks-and-ios-7/, Oct. 26, 2013.

Jen Sipila, "Securing user data with Keychain for iOS", medium.com, URL:https://medium.com/ios-os-x-development/securing-user-data-with-keychain-for-ios-e720e0f9a8e2, Feb. 25, 2017.

Ravishanker Kusuma, "iOS KeyChain Tutorial", hayageek.com, URL:http://hayageek.com/ios-keychain-tutorial/, Mar. 10, 2014.

Bingkun Guo, "iOS Security", wustl.edu, URL:https://www.cse.wustl.edu/~jain/cse571-14/ftp/ios_security/index.html, Dec. 1, 2014.

\* cited by examiner

METHOD AND SYSTEM FOR IMPLEMENTING AN ENCRYPTION SDK

RELATED APPLICATIONS

The present application is a continuation of U.S. application Ser. No. 15/950,885 titled, "METHOD AND SYSTEM FOR IMPLEMENTING AN ENCRYPTION SDK", filed on Apr. 11, 2018, which claims the benefit of priority of U.S. Provisional Application Ser. No. 62/484,371 titled, "METHOD AND SYSTEM FOR IMPLEMENTING AN ENCRYPTION SDK", filed on Apr. 11, 2017, which are hereby incorporated by reference in their entirety.

BACKGROUND

In recent times, there has been a proliferation of mobile computing devices that are available to end users to implement mobile computing functions. Indeed, these mobile computing devices encompass all ranges of mobile hardware types (such as laptops, tablets, smartphones, or smartwatches) and as well as a range of different operating platforms (such as iOS, Android, Windows, etc.).

With the increasing proliferation of these mobile computing devices, there is now also an accelerating increase in the volume of data that is now being loaded onto those mobile devices as a matter of routine usage. The issue is that mobile computing devices are often subject to variety of threats that affect the security of the data loaded onto those devices. In fact, one of the most common of the threats is the simple case of a lost or stolen device that can then be accessed by the person that find or steals the device.

Even when the mobile device includes security mechanisms, those mechanisms may not be robust enough to adequately safeguard the security of data on the device. For example, iOS provides device encryption that relies upon a passcode to protect the contents of an iOS-based mobile phone. The problem is that the security of a device in this arrangement is only as good as the strength of the user's device passcode, which often encompasses only four numeric digits or is not even set at all.

This problem may have severe consequences if the data loaded onto the mobile device is of a sensitive nature. Many organizations expect that their employees are using the mobile devices as part of their work to enhance workforce productivity, which means that sensitive proprietary content for those organizations are likely to exist on users' mobile devices. This may occur, for example, when a user is copying files directly from a corporation's servers onto the mobile device. In addition, the user may be copying data of a professional and/or collaborative nature from a cloud-based content management platform.

Therefore, there are challenges that exist in being able to provide this shared access and collaboration with high availability of data (e.g., an unfettered ability to download and upload files) while also being able to do so in a secure manner. The problem to be solved is thus rooted in technological limitations of the legacy approaches. Improved techniques, in particular improved application of technology, are needed to address the problem of incorporating improved security features to a mobile device platform.

SUMMARY

Some embodiments of the present disclosure address the above-described problems by incorporating a new layer of security within mobile devices using an encryption software developers kit (SDK), which implements a standalone component that makes it easy for any internal applications to encrypt, decrypt, and view sensitive data stored on the device's internal storage.

Further details of aspects, objects, and advantages of the invention are described below in the detailed description, drawings and claims. Both the foregoing general description and the following detailed description are exemplary and explanatory and are not intended to be limiting as to the scope of the invention.

BRIEF DESCRIPTION OF THE DRAWINGS

The drawings described below are for illustration purposes only. The drawings are not intended to limit the scope of the present disclosure.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments. Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Illustrative Embodiment

Some embodiments of the present disclosure address the above-described problems by incorporating a new layer of security within mobile devices using an encryption SDK, which implements a standalone component that makes it easy for any internal applications to encrypt, decrypt, and view sensitive data stored on the device's internal storage. Consumers of the encryption SDK are fully able to encrypt/decrypt data without being required to have any in-depth knowledge of cryptography, or to significantly alter the structure of the codebase of an existing application storing data unencrypted.

Figure 1:
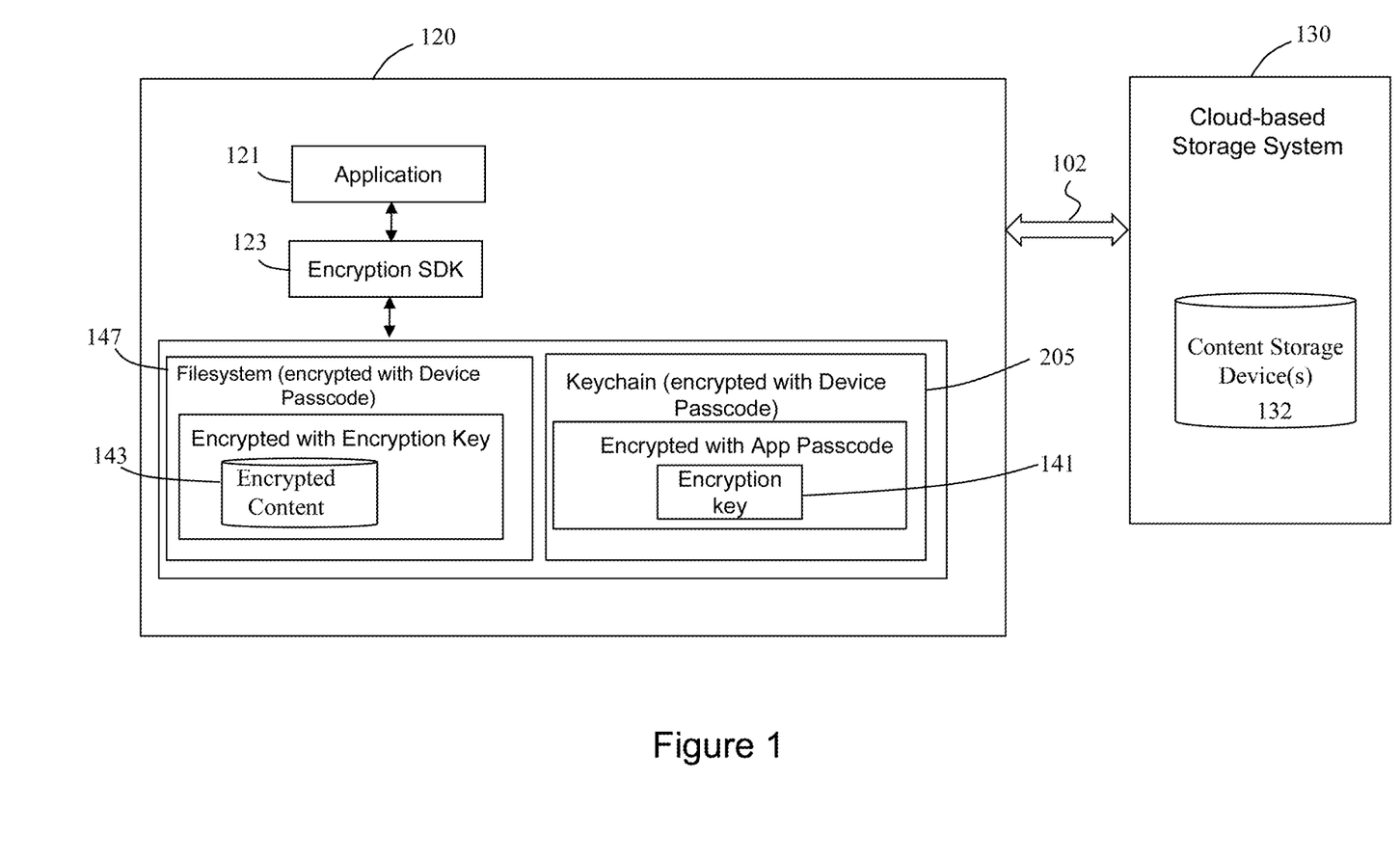
FIG. 1 illustrates an example architecture that may be used to implement some embodiments of the invention.

FIG. 1 illustrates an example architecture that may be used to implement some embodiments of the invention. Mobile device 120 includes an application 121 that is operable to allow a user to utilize the mobile device 120 to access data located on a cloud-based storage system 130 (as well as other sources of data to be accessed by the mobile device 120). The mobile device 120 may also include a communications mechanism to send and receive data over a network 102 to a remote cloud-based storage system 130. In some embodiments, the communications mechanism operates to allow the mobile device 120 to communicate using a cellular network connection, e.g., when the mobile device 120 is a mobile telephone. The communications mechanism may also be implemented to allow the mobile device 120 to communicate using other networking paradigms, e.g., to communicate over a wireless fidelity (WiFi) network.

The cloud-based storage system 130 includes a mobile interface that is operable to receive data requests and to send requested data to the mobile device. The cloud-based storage system 130 may include or be associated with one or more content storage devices 132. The content storage devices 132 hold data that is maintained by the cloud-based storage system 130. An encryption SDK 123 is provided within this architecture to access data within the device to be encrypted/decrypted.

Recall that conventional mobile systems (e.g., iOS-based mobile systems) only provide a single layer of device encryption that relies upon a passcode and/or password to protect the contents of an iOS-based mobile phone (the terms "password" and "passcode" may be used in a collective manner herein to apply to any of passwords, passcodes, or any other similar mechanisms or functionality). The problem is that the security of a device in this arrangement is only as good as the strength of the user's device passcode, which is often very weak having only four numeric digits or is not even set at all.

In the present embodiment, at the mobile device 120, an additional layer of encryption is provided to encrypt content "at rest", before the content is stored to disk. Here, the original content is encrypted with an encryption key 141 to generate encrypted content 143. The encrypted content 143 is then stored on the mobile device (within the encrypted filesystem 147) that is protected by device encryption using the device's passcode 144.

This approach will therefore protect against a lost or stolen device where the device may have a weak or compromised passcode. Even if the mobile device is lost or stolen and the device passcode has been broken, the additional layer of the key-based encryption in the current embodiment will serve to protect the security of the data on the device.

It is noted that in some embodiments, the cloud provider can also set complexity requirements on the application passcode, without affecting the user's device passcode. This facilitates proper security for the app data without necessarily affecting the convenience of using the device.

Figure 2:
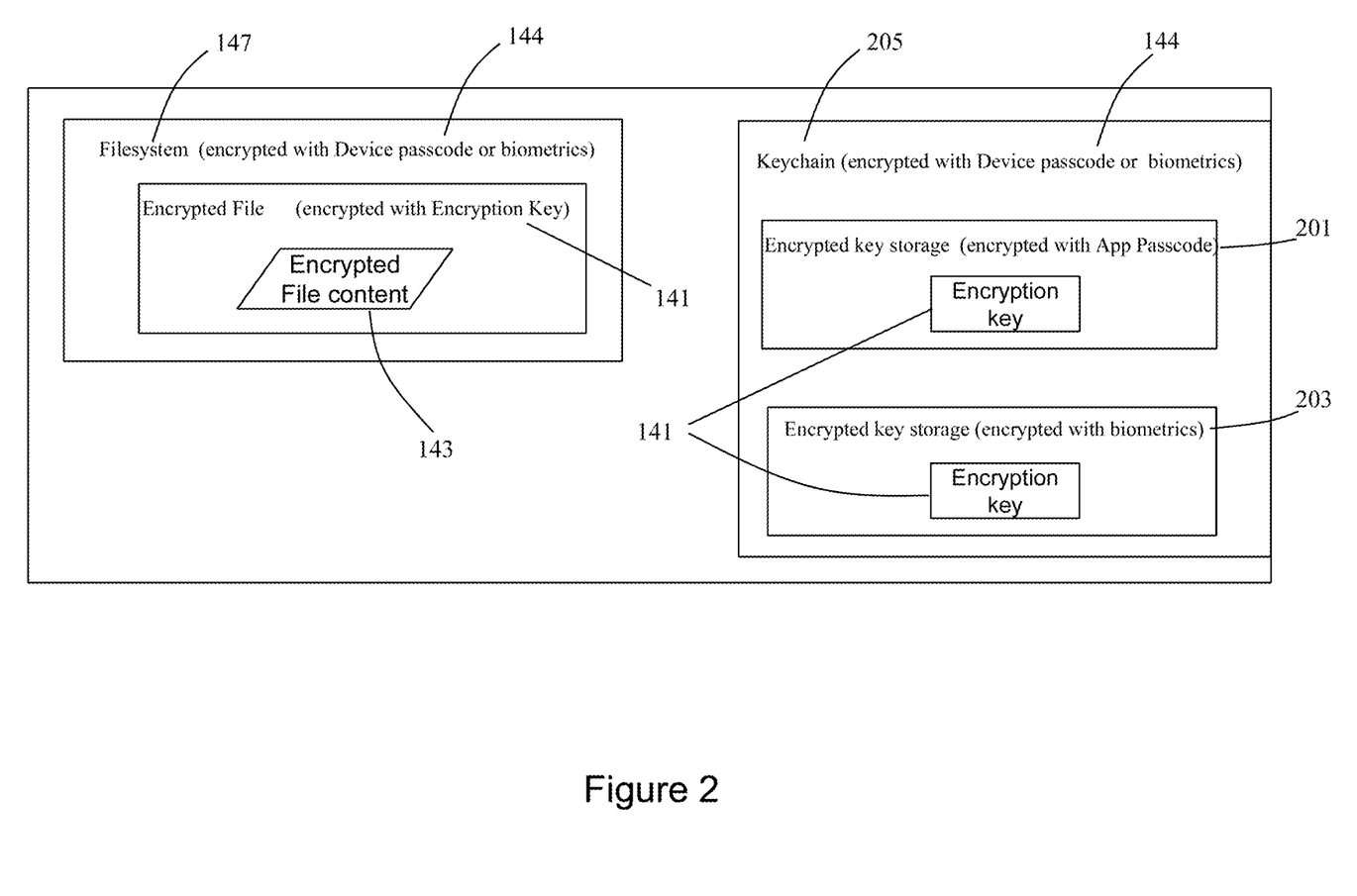
FIG. 2 provides a more detailed illustration of an approach according to some embodiments of the invention.

FIG. 2 provides a more detailed illustration of this approach. Here, the left-hand side of the figure illustrates the fact that encrypted contents 143 (that is encrypted with encryption key 141) is stored within a device file system 147 that is protected by a device passcode 143. Thus, multiple levels of security have been applied to the content stored within the mobile device.

The encryption key itself is also stored in a secure manner at the mobile device. Many devices provide management components to manage the storage of password/passcode information, account names, credit cards, etc. For example, in iOS devices, a "keychain" is provided to perform this type of password management.

In some embodiments of the invention, the encryption key 141 is stored in a protected manner within a keychain 205 (or its equivalent on a non-iOS device). For example, an application password and/or passcode 201 may be used to protect the encryption key 141. Alternatively, some sort of biometrics 203 (e.g., fingerprint recognition) may be used to protect the encryption key 141.

In this way, the approach makes it very difficult for a malicious person to access the encrypted file content 143 in an unauthorized manner. Even if the device is lost and the device passcode 144 is very weak, the encrypted content 143 is nonetheless still encrypted by the encryption key 141 that is inaccessible unless the malicious person also manages to identify the application password/passcode 201 or can break the biometric protection 203.

Figure 3:
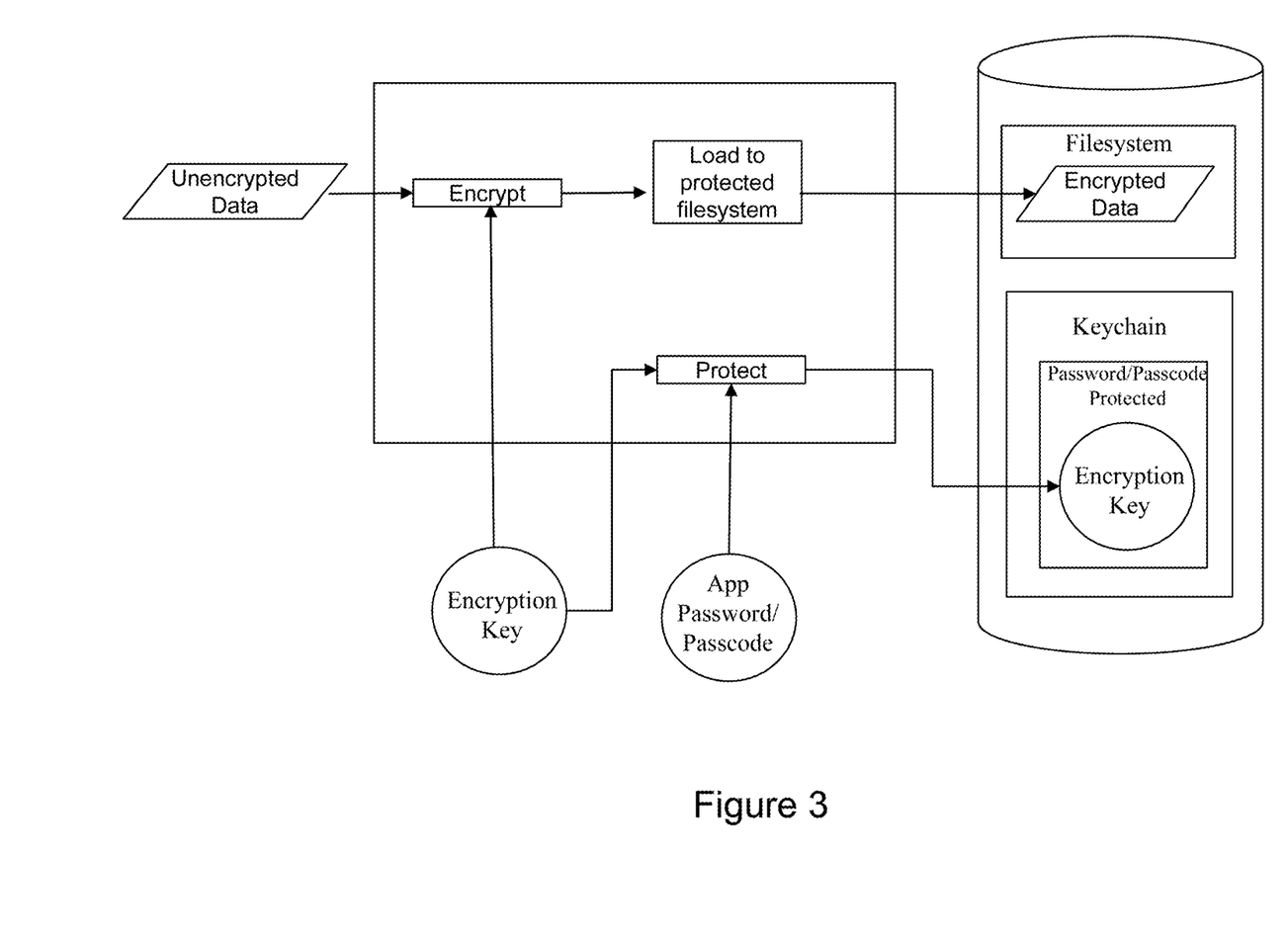
FIG. 3 illustrates the logical flow of how data is stored within the system according to some embodiments of the invention.

FIG. 3 illustrates the logical flow of how data is stored within the system according to some embodiments of the invention. The unencrypted data arrives within the system to be stored, e.g., to be stored within a persistent storage component at the mobile device. The unencrypted data then undergoes encryption using an encryption key to generate encrypted data. The encrypted data is then stored within the filesystem (that is protected with the device passcode). The encryption key itself is password protected (e.g., with an application password/passcode). That password protected key is then stored within the keychain. It is noted that the password/passcode in this embodiment is not stored alongside the key within the keychain and may not be stored anywhere inside the encryption SDK.

Figure 4:
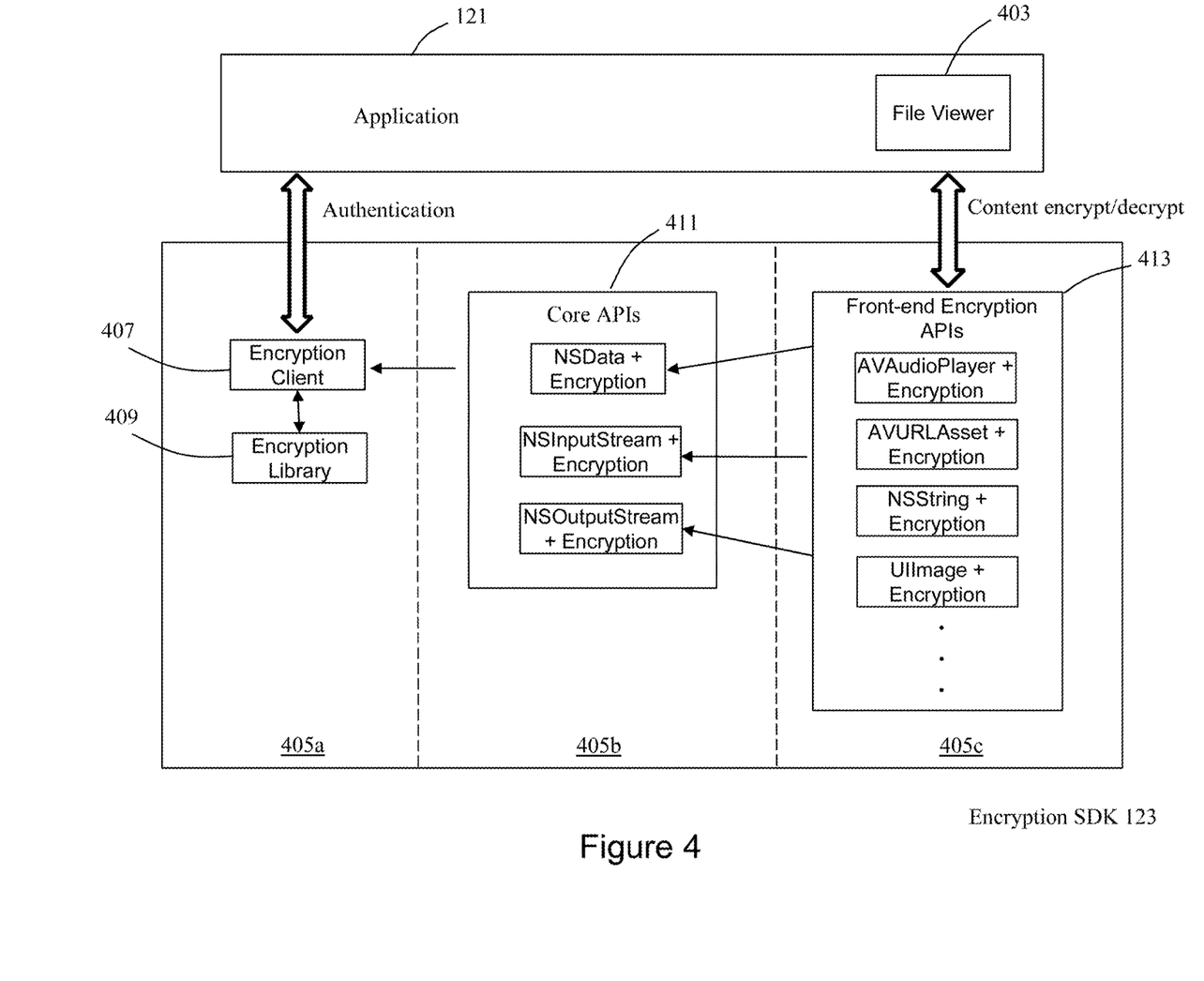
FIG. 4 illustrates an architecture for implementing the encryption SDK according to some embodiments of the invention.

FIG. 4 illustrates an architecture for implementing the encryption SDK 123 according to some embodiments of the invention. The encryption SDK 123 is the component that is accessed by any other component within the device (such as application 121) to encrypt/decrypt content on the device. For example, application 121 may correspond to an application for viewing files, using a file viewer subcomponent 403 that needs to view a media file that is currently stored in an encrypted form on the device, where the encryption SDK 123 is called to unencrypt that encrypted media file so that it can be viewed/played.

In the current embodiment, the encryption SDK is implemented having three distinct layers (layers 405a, 405b, and 405c) that each correspond to different functional purposes.

Layer 405a comprises an encryption client 407 that handles authentication and secure key storage, as well as the actual work of performing encryption/decryption functionality, e.g., by accessing an encryption library 409 that implements the specific cryptographic algorithms necessary to encrypt or decrypt data. Any suitable cryptography algorithm or library may be employed in embodiments of the invention, e.g., using Apple's CommonCrypto library, or OpenSSL. Some or all of the following cryptographic approaches may be implemented in some embodiments of the invention: AES-256 encryption; CBC mode; Password stretching with PBKDF2; Password salting; Random IV; and/or Encrypt-then-hash HMAC Layer 405b comprises a core set 411 of API functions that can be called to implement base levels of encryption or decryption for data content, as data is written to or read from the filesystem. These are the underlying calls made by other API calls to actually perform specific tasks of encryption or decryption. For example, "NSData+encryption" corresponds to a core API call that pertains to encryption of regular data files. "NSInputStream+encryption" corresponds to a core API call that pertains to decryption of streams of data being read from disk. "NSOutputStream+encryption" corresponds to a core API call that pertains to the encryption of streams of data as they are written to disk.

Layer 405c comprises the front-end set 413 of API calls that are directly accessed by a consumer in order to access encrypted content on the system. It is this layer that provides a "convenience" API for making it simpler for other applications/developers to integrate with the encryption SDK 123. In some embodiments, the front-end set 413 of API calls comprises one or more of the following: (a) AVAudioPlayer+encryption (e.g., for accessing audio files) (b) AVURLAsset+encryption (e.g., for accessing assets such as video from a given URL), (c) NSFileManager+encryption (e.g., for accessing file metadata, etc.), (d) NSString+encryption (e.g., for accessing string content), and/or (e) UIImage+encryption (e.g., for accessing image content). These are implemented in some embodiments as extensions to programming classes, e.g., C, C++, and/or Objective C++ classes.

The general idea is that an application 121 that seeks encrypted content from internal storage will be configured to call the appropriate one of the front-end APIs 413 that is suitable for the specific asset being accessed. These front-end APIs 413 correlate to the ordinary version of these API calls having the same/similar names, but the API calls within the encryption SDK encompass the encryption functionality. Therefore, the change to an existing piece of code that reads unencrypted files is often as simple as a minor change to the name of a single API call. For example, simply by changing "playFileAtPath:" to "playEncryptedFileAtPath:", an application can add support for efficient playback of encrypted video files.

Internally, the front-end APIs 413 will be configured to call the appropriate core API 411 to perform encryption/decryption functionality. For example, the "UIImage+encryption" call in layer 405c will be configured to call the "NSData+encryption" function in layer 405b. Similarly, the "AVURLAsset+encryption" call in layer 405c will be configured to call the "NSInputStream+encryption" function in layer 405b.

It is these core API functions in layer 405b that would then call the underlying encryption client 407 in layer 405a to perform the actual encryption/decryption functionality. In the current embodiment, the encryption key is loaded into memory by the encryption client 407 in layer 405a, and the encryption key is not shared with any components in the other layers 405b and 405c.

Once the encrypted content has been decrypted, the decrypted content is then passed back to layer 405c, where that decrypted content can then be sent to the appropriate viewer/system player that is appropriate for the data/media type being accessed.

This approach provides numerous advantages over the alternative approaches. One key advantage is that this approach allows one to implement encryption/decryption very efficiently from just the front-end APIs, where the simplified interface does not require any extensive knowledge of how to perform low-level cryptographic functions. Instead, since the front-end APIs are configured to call the lower-level calls, this approach completely abstracts out those complex details from being required to utilize the front-end APIs. For example, for encryption/decryption of streaming data, a conventional system would require one to provide extensive coding to handle the raw encrypted/decrypted data throughout that process, e.g., to buffer the streamed content through the encryption/decryption process. In contrast, those details in the current embodiment are given to the functions at the core APIs, and hence the calling application at the front-end merely has to identify the content to be accessed and the detailed level of functionality (e.g., buffering) is left for the core API to implement without that level of complexity needing to be provided.

Another advantage provided by this approach is the fact that the encryption key is maintained only at layer 405a and is not shared with any components in the other layers 405b and 405c. This prevents any possible misuse of the encryption keys by applications that call any of the API functions within the encryption SDK and minimizes the surface area for potential bugs that could compromise the key within the SDK itself.

Tools can be provided to make sure that future developers of applications that use the encryption SDK do not accidentally use unencrypted file I/O in places where they should use encrypted I/O. A first type of tool is a header file that can be included in the precompiled header of consumers of the SDK that will cause deprecation warnings on methods performing unencrypted file I/O, with a prompt to use the corresponding encrypted method. This will force developers to think about whether the content being written to disk should be encrypted or not. If it needs to be unencrypted, this specific warning can be disabled, e.g., via a #pragma. In addition, an LLDB script can be provided to break the debugger when it detects unencrypted file I/O.

Figure 5:
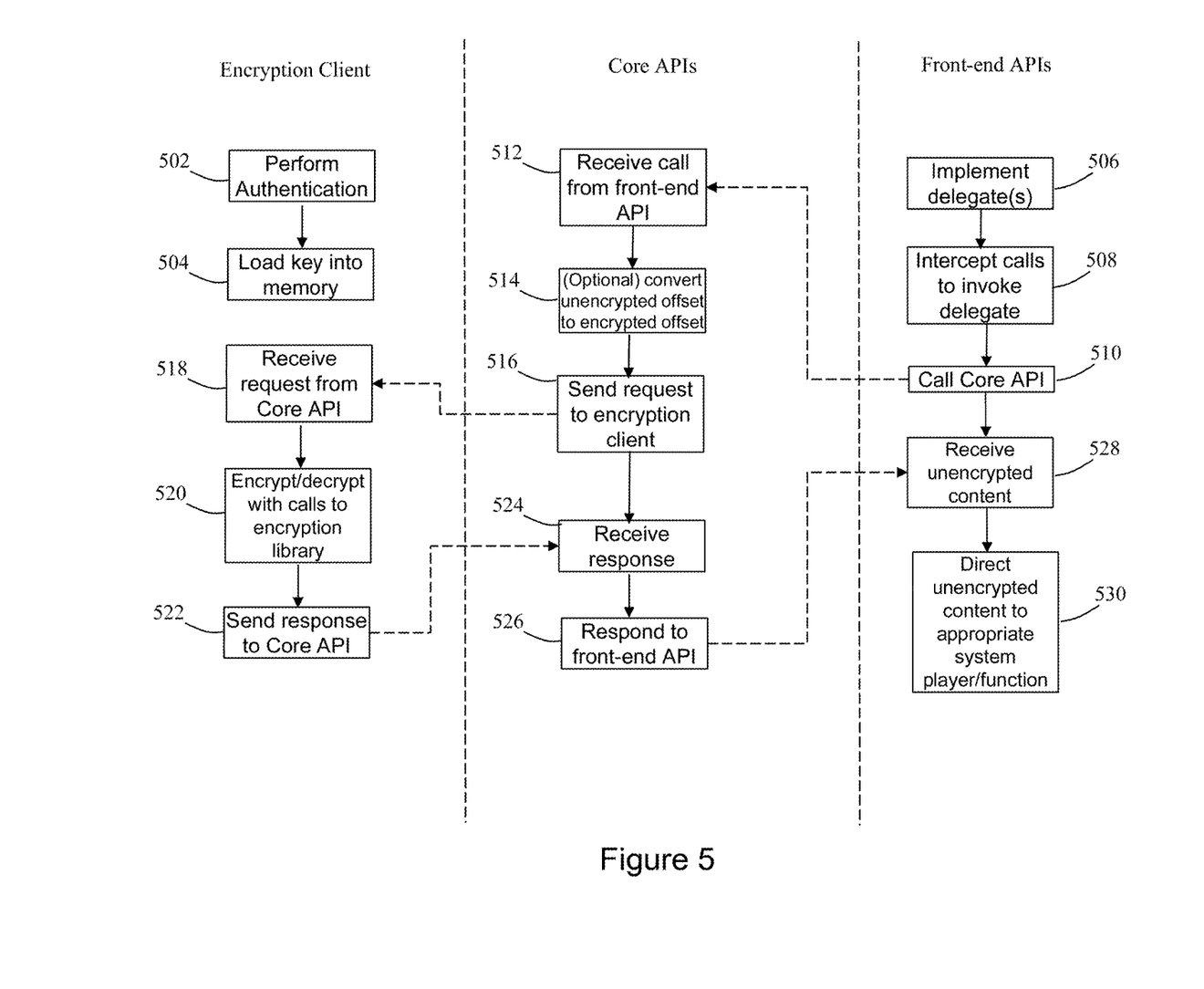
FIG. 5 shows a flow of processing between components in an encryption SDK according to some embodiments of the invention.

FIG. 5 shows a flow of processing between these components according to some embodiments of the invention. At 502, initial authentication is performed by the encryption client. The authorization may be on the basis, for example, by the user providing an application password within a user interface at the application.

Next, at 504, the encryption key is loaded into memory. In some embodiments when an encryption "setPasscode" function is called for the first time, the system will create a randomly-generated encryption key, e.g., an AES key. This key will be used for all encrypt/decrypt operations. This key will be encrypted by the user-supplied application passcode and stored in the user's keychain. When the user changes their passcode, the system will re-encrypt the key using the new passcode. Whenever the user calls an encryption "authenticateWithPasscode" function, the system will use the passcode to decrypt the encryption key and load it into memory for use in encryption/decryption.

As noted above, in order to make it simpler to integrate with the encryption SDK, encrypted implementations are provided for many of the common APIs that use file I/O to store and view media, documents, and other content. For example, for Apple's Cocoa Touch, the list of front-end APIs in some embodiments are shown in FIG. 4. This makes it very simple for consumers of the API to switch from using unencrypted files to encrypted ones.

At 506, a delegate is configured for the standard system calls that correlate to the functions in the front-end API. The delegates are configured to intercept, at 508, the calls that are made to the standard system calls and to implement a call (e.g., a callback) to the functions within the encryption SDK. From the front-end API that is called, that front-end call then, at 510, calls the appropriate one of the core API call.

At 512, the core API receives the request from the front-end API. At this point, an optional step 514 may be performed (if necessary) to convert from an unencrypted offset value into an encrypted offset value. The idea is that when requesting data, the consumer of the SDK knows the offset within an unencrypted file that is desired for access, but since the file is actually being stored as an encrypted file, that offset value may not be correct within the encrypted file. To address this situation, the offset is translated into the correct value for the encrypted file. In some embodiments, this is performed by understanding that an encrypted file will likely include a header having a designated length, as well as one or more possible spacers/buffers are boundary locations (e.g., at the end of the file). Therefore, the offset translation can be performed by accounting for these file pieces that appear in the encrypted file but does not appear in the unencrypted file. It is noted that this action may not need to be performed for all types of requests. For example, a request to decrypt an entire file (without a specific offset in the request) will obviously not require this type of offset translation.

At 516, a request is then sent from the core API to the encryption client. At 518, this request is received at the encryption client for processing. At 520, the encryption client uses the appropriate module within the encryption library to perform the requested action (and with access to the encryption key in memory). A response (e.g., the unencrypted content) is, at 522, returned back to the calling core API, which is received at 524. At 526, the core API sends the response to the calling function at the front-end API, which is received at 528.

At 530, the unencrypted content is then directed to the appropriate system player/function to display/view the content. At this point, the process ends.

In some embodiments, the system allows one to proceed to a given offset for a specific moment to be viewed. It is noted that CBC (cipher block mode) encryption may also be employed to support decryption from any random location within a file.

All data passed to the encryption SDK for storage should always be encrypted before being passed to persistent storage. In some embodiments, all data is read into memory without ever being unencrypted on disk. In alternative embodiments, certain exceptions may be applied to key specific types of data so that the contents are being decrypted to a temporary location on disk (e.g., using NSData+Encryption), and then the system deletes the unencrypted version once they have been viewed. This is because there are certain standard/system viewers that can only operate upon unencrypted data. For example, viewers for certain types of password-protected files need to have the unencrypted files to be able to prompt for the password, and in these circumstances, an exception can be made to store the files in an unencrypted way.

Therefore, what has been described is an improved approach to implement an encryption SDK and a new layer of security within mobile devices, which makes it very easy for any application to encrypt, decrypt, and efficiently view sensitive data on the device.

Figure 6A:
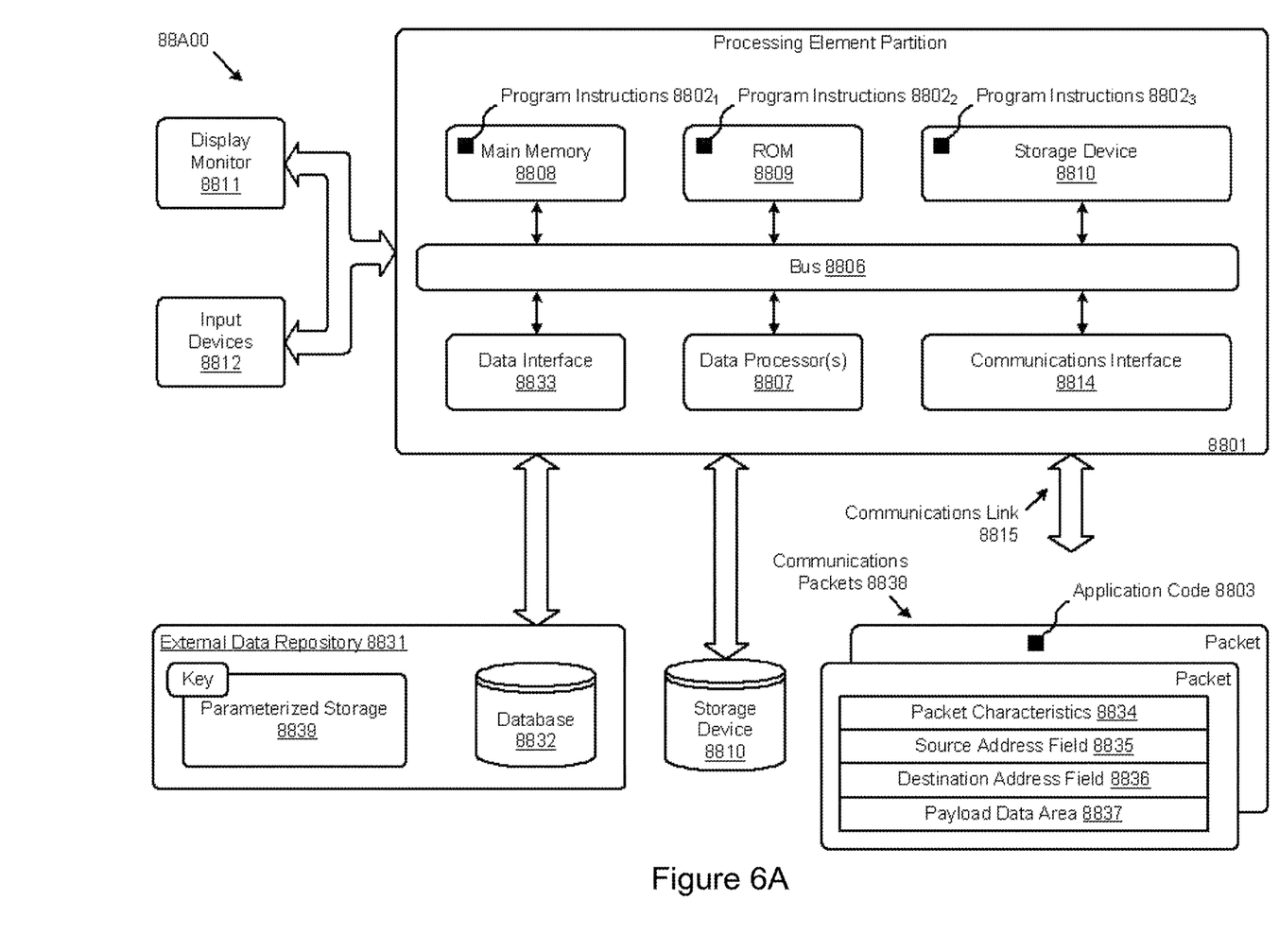
FIGS. 6A-6C depict exemplary architectures of components suitable for implementing embodiments of the present disclosure, and/or for use in the herein-described environments.

FIG. 6A depicts a block diagram of an instance of a computer system 88A00 suitable for implementing embodiments of the present disclosure. Computer system 88A00 includes a bus 8806 or other communication mechanism for communicating information. The bus interconnects subsystems and devices such as a central processing unit (CPU), or a multi-core CPU (e.g., data processor 8807), a system memory (e.g., main memory 8808, or an area of random access memory (RAM)), a non-volatile storage device or non-volatile storage area (e.g., read-only memory 8809), an internal or external storage device 8810 (e.g., magnetic or optical), a data interface 8833, a communications interface 8814 (e.g., PHY, MAC, Ethernet interface, modem, etc.). The aforementioned components are shown within processing element partition 8801, however other partitions are possible. The shown computer system 88A00 further comprises a display 8811 (e.g., CRT or LCD), various input devices 8812 (e.g., keyboard, cursor control), and an external data repository 8831.

According to an embodiment of the disclosure, computer system 88A00 performs specific operations by data processor 8807 executing one or more sequences of one or more program code instructions contained in a memory. Such instructions (e.g., program instructions 88021, program instructions 88022, program instructions 88023, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination therefrom.

According to an embodiment of the disclosure, computer system 88A00 performs specific networking operations using one or more instances of communications interface 8814. Instances of the communications interface 8814 may comprise one or more networking ports that are configurable (e.g., pertaining to speed, protocol, physical layer characteristics, media access characteristics, etc.) and any particular instance of the communications interface 8814 or port thereto can be configured differently from any other particular instance. Portions of a communication protocol can be carried out in whole or in part by any instance of the communications interface 8814, and data (e.g., packets, data structures, bit fields, etc.) can be positioned in storage locations within communications interface 8814, or within system memory, and such data can be accessed (e.g., using random access addressing, or using direct memory access DMA, etc.) by devices such as data processor 8807.

The communications link 8815 can be configured to transmit (e.g., send, receive, signal, etc.) any types of communications packets 8838 comprising any organization of data items. The data items can comprise a payload data area 8837, a destination address 8836 (e.g., a destination IP address), a source address 8835 (e.g., a source IP address), and can include various encodings or formatting of bit fields to populate the shown packet characteristics 8834. In some cases, the packet characteristics include a version identifier, a packet or payload length, a traffic class, a flow label, etc. In some cases, the payload data area 8837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 8807 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 8831, which in turn can be formatted into any one or more storage areas, and which can comprise parameterized storage 8839 accessible by a key (e.g., filename, table name, block address, offset address, etc.).

Execution of the sequences of instructions to practice certain embodiments of the disclosure is performed by a single instance of the computer system 88A00. According to certain embodiments of the disclosure, two or more instances of computer system 88A00 coupled by a communications link 8815 (e.g., LAN, PTSN, or wireless network) may perform the sequence of instructions required to practice embodiments of the disclosure using two or more instances of components of computer system 88A00.

The computer system 88A00 may transmit and receive messages such as data and/or instructions organized into a data structure (e.g., communications packets 8838). The data structure can include program instructions (e.g., application code 8803), communicated through communications link 8815 and communications interface 8814. Received program code may be executed by data processor 8807 as it is received and/or stored in the shown storage device or in or upon any other non-volatile storage for later execution. Computer system 88A00 may communicate through a data interface 8833 to a database 8832 on an external data repository 8831. Data items in a database can be accessed using a primary key (e.g., a relational database primary key).

The processing element partition 8801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 8807. Some embodiments include one or more special-purpose hardware components (e.g., power control, logic, sensors, transducers, etc.). A module may include one or more state machines and/or combinational logic used to implement or facilitate performance characteristics.

Various implementations of the database 8832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of the present disclosure). Such files or records can be brought into and/or stored in volatile or non-volatile memory.

Figure 6B:
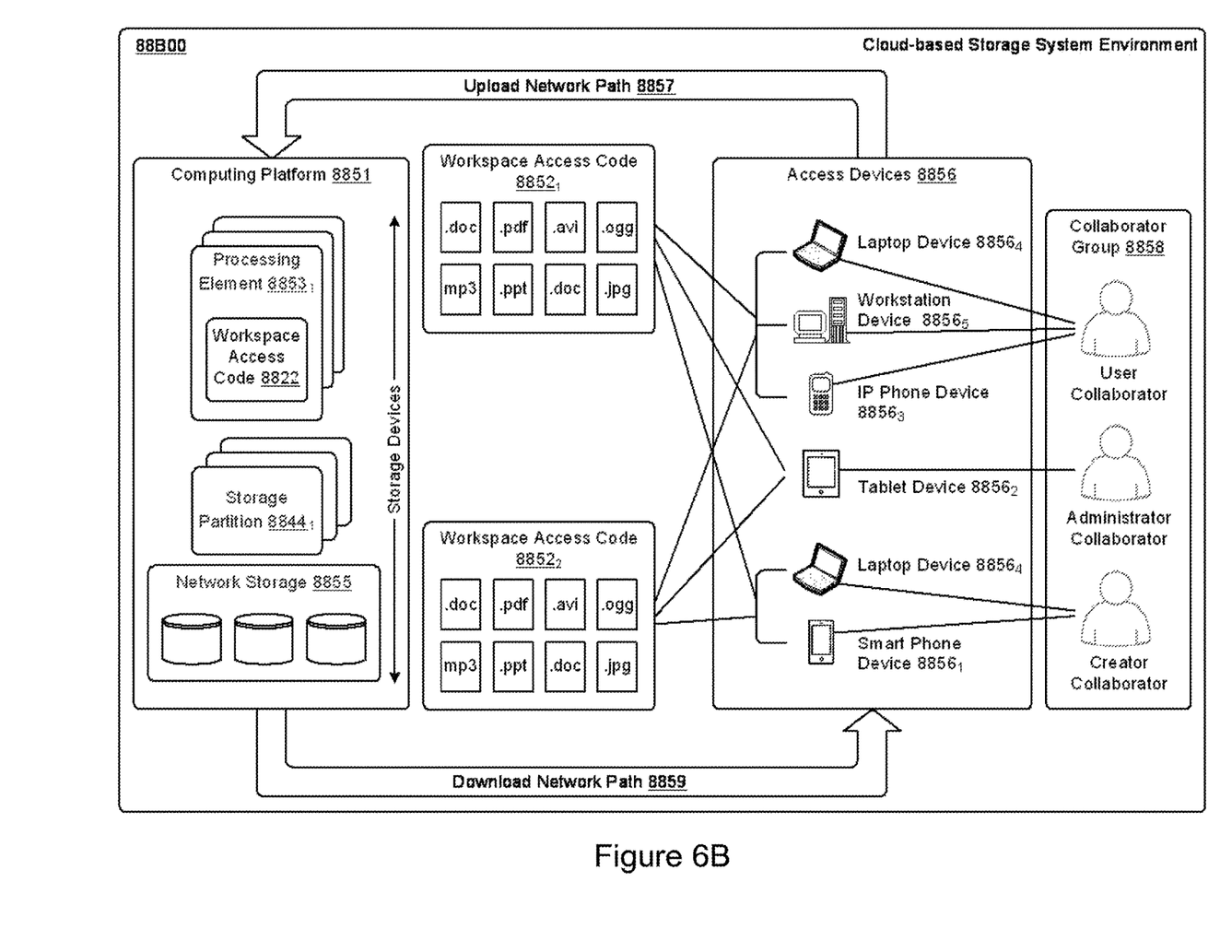

FIG. 6B depicts a block diagram of an instance of a cloud-based environment 88B00. Such a cloud-based environment supports access to workspaces through the execution of workspace view code (e.g., workspace access code 8852$_1$ and workspace access code 8852$_2$. Workspace access code can be executed on any of the shown access devices (e.g., laptop device 8852$_4$, workstation device 8852$_5$, IP phone device 8852$_3$, tablet device 8852$_2$, smart phone device 8852$_1$, etc.).

A group of users can form a collaborator group 8858, and a collaborator group can be comprised of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code. The shown access devices may include an interface that is operable to receive data requests and to send requested data to the mobile device. An encryption SDK 123 is provided within the shown access devices to access data within the device to be encrypted/decrypted. The access devices 8856 may also include a communications mechanism to send and receive data over a network 8857 and 8859 to a remote cloud-based storage system on the computing platform 8851.

A portion of workspace access code can reside in and be executed on any access device. Also, a portion of the workspace access code can reside in and be executed on any computing platform, including in a middleware setting. As shown, a portion of the workspace access code resides in and can be executed on one or more processing elements (e.g., processing element $8852_3$). The workspace access code can interface with storage devices such the shown networked storage 8855. Storage of workspaces and/or any constituent files or objects, and/or any other code or scripts or data can be stored in any one or more storage partitions (e.g., storage partition $8854_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 8857). A stored workspace can be delivered to a particular user and/or shared with other particular users via a download (e.g., a download from a processing element to an access device over a download network path 8859).

Figure 6C:
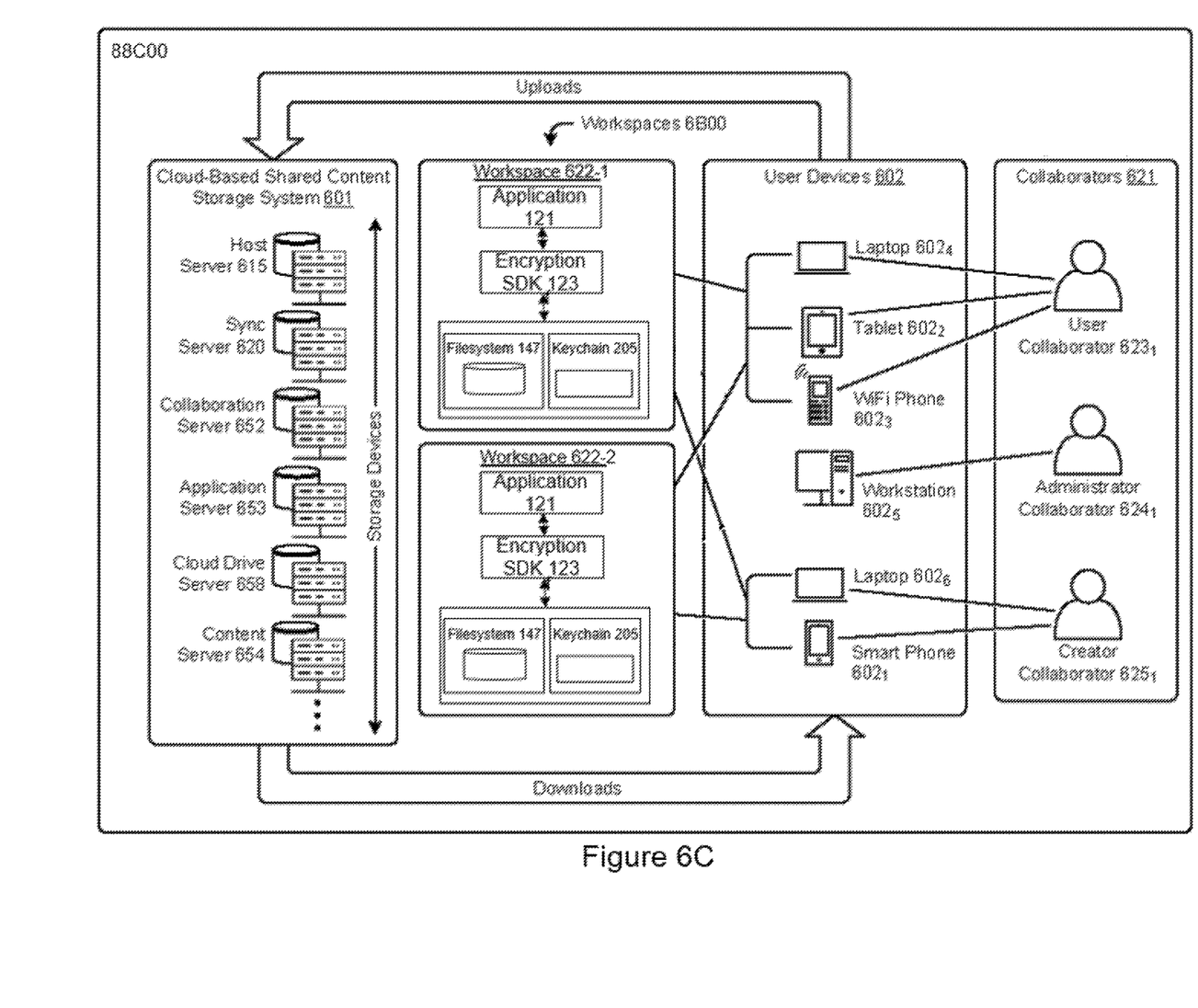

FIG. 6C presents a schematic view of workspaces 88C00. As an option, one or more variations of workspaces 6B00 or any aspect thereof may be implemented in the context of the architecture and functionality of the embodiments described herein. As an option, one or more variations of workspaces 6B00 or any aspect thereof may be implemented in the context of the architecture and functionality of the embodiments described herein. The workspaces 6B00 or any aspect thereof may be implemented in any environment.

The embodiments shown in FIG. 6C is merely one example implementation of herein disclosed techniques in the cloud-based environment 88C00 where two or more of the collaborators 621 (e.g., the user collaborator $623_1$, the administrator collaborator $624_1$, and the creator collaborator $625_1$) create and/or join peer-to-peer collaborator networks. In some cases, the collaborators 621 might view certain attributes (e.g., collaborator network members, potential network members, member roles, etc.) of the collaborator networks in a respective collaborator-specific workspace (e.g., workspace $622_1$, workspace $622_2$, etc.). In other cases, the collaborator network is formed to share a content object (e.g., computer file, electronic document, image, etc.) and/or a collection (e.g., folder) of content objects, where each collaborator might have certain access capabilities (e.g., for viewing, editing, downloading, etc.) pertaining to the shared content object in a respective collaborator-specific workspace (e.g., workspace $622_1$, workspace $622_2$, etc.) on the respective user devices.

The embodiment shown in FIG. 6C illustrate example architectures that may be used to implement some embodiments of the invention in a cloud-based environment. User devices 602 includes an application 121 that is operable to allow a user to utilize the specific user device (e.g., laptop $602_4$, tablet $602_2$, WiFi Phone $602_3$, laptop $602_6$, smart phone $602_1$) to access data located on a cloud-based Shared Content Storage System 601 (as well as other sources of data to be accessed by the user devices 602). The user devices 602 may also include a communications mechanism to send and receive data over a network to the remote cloud-based Shared Content Storage System 601. In some embodiments, the communications mechanism operates to allow the user devices 602 to communicate using a cellular network connection, e.g., when the user devices 602 is a mobile telephone, WiFi phone, or tablet. The communications mechanism may also be implemented to allow the user devices 602 to communicate using other networking paradigms, e.g., to communicate over a WiFi network.

The user devices 602 includes an interface that is operable to receive data requests and to send requested data to the user devices. The cloud-based storage system 601 may include or be associated with one or more content storage devices. The content storage devices hold data that is maintained by the cloud-based storage system 601. An encryption SDK 123 is provided within this architecture to access data within the user device to be encrypted/decrypted. As discussed above, the encrypted content is then stored on the user devices (within the encrypted filesystem 147) that is protected by device encryption using the device's passcode. In some embodiments of the invention, the encryption key is stored in a protected manner within a keychain 205 (or its equivalent on a non-iOS device).

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

What is claimed is:

1. A method comprising:
   identifying data in a cloud-based environment, the cloud-based environment comprising at least a storage device storing at least one content object accessible over a network;
   implementing a security layer on a device, wherein the security layer manages encryption for the data retrieved onto the device from the cloud-based environment; and
   generating encrypted content at the security layer before storing the encrypted content by:
      receiving the at least one content object to be stored at the device from the cloud-based environment, and
      encrypting the at least one content object with an encryption key, wherein the encrypted key is password protected; and
   storing the encrypted content within an encrypted filesystem on the device;
   wherein the security layer comprises a first layer that comprises an encryption client that manages authentication and secure key storage, a second layer that comprises a core set of application programming interface (API) functions that implements levels of encryption or decryption for data content, and a third layer that comprises a front-end set of APIs calls.

2. The method of claim 1, further comprising storing the encrypted key within a keychain.

3. The method of claim 1, wherein the encryption key is stored in a first location and encrypted content is stored in a second location, wherein the first location and the second location are different.

4. The method of claim 1, wherein an application password or application passcode is not stored within a keychain.

5. The method of claim 1, wherein implementing the security layer on the device further comprises:

performing an authentication within a user interface at an application; loading the encryption key into memory;

configuring delegates that correlates to a function in the third layer, wherein the delegates are configured to intercept calls that are made and to implement a callback to the functions in the security layer;

converting an unencrypted offset value into an encrypted offset value that offsets a first value within an unencrypted file into a second value within the encrypted file;

receiving, at the second layer, a request to perform an action from the third layer, wherein the request is performed with access to the encryption key;

returning a response to the request back to the function at the third layer, wherein the response corresponds to an unencrypted content; and presenting the unencrypted content.

6. The method of claim 1, wherein the security layer corresponds to an encryption software developers kit.

7. A computer program product, embodied in a non-transitory computer readable medium, the non-transitory computer readable medium having stored thereon a sequence of instructions which when stored in memory and executed by a processor causes the processor to perform a set of acts, the act of:
identifying data in a cloud-based environment, the cloud-based environment comprising at least a storage device storing at least one content object accessible over a network;
implementing a security layer on a device, wherein the security layer manages encryption for the data retrieved onto the device from the cloud-based environment; and
generating encrypted content at the security layer before storing the encrypted content by:
receiving the at least one content object to be stored at the device from the cloud-based environment, and
encrypting the at least one content object with an encryption key, wherein the encrypted key is password protected; and
storing the encrypted content within an encrypted filesystem on the device;
wherein the security layer comprises a first layer that comprises an encryption client that manages authentication and secure key storage, a second layer that comprises a core set of application programming interface (API) functions that implements levels of encryption or decryption for data content, and a third layer that comprises a front-end set of APIs calls that are directly accessed by a consumer to access encrypted content.

8. The computer program product of claim 7, further comprising storing the encrypted key within a keychain.

9. The computer program product of claim 7, wherein the encryption key is stored in a first location and encrypted content is stored in a second location, wherein the first location and the second location are different.

10. The computer program product of claim 7, wherein an application password or application passcode is not stored within a keychain.

11. The computer program product of claim 7, wherein implementing the security layer on the device further comprises:
performing an authentication within a user interface at an application;
loading the encryption key into memory;
configuring delegates that correlates to a function in the third layer, wherein the delegates are configured to intercept calls that are made and to implement a callback to the functions in the security layer;
converting an unencrypted offset value into an encrypted offset value that offsets a first value within an unencrypted file into a second value within the encrypted file;
receiving, at the second layer, a request to perform an action from the third layer, wherein the request is performed with access to the encryption key;
returning a response to the request back to the function at the third layer, wherein the response corresponds to an unencrypted content; and presenting the unencrypted content.

12. The computer program product of claim 7, wherein the security layer corresponds to an encryption software developers kit.

13. A system comprising:
a storage medium having stored thereon a sequence of instructions and
a processor or processors that execute the instructions to cause the processor or processors to perform a set of acts, the acts comprising:
identifying a storage device in a cloud-based environment, the storage device storing at least one content object accessible over a network;
identifying data in a cloud-based environment, the cloud-based environment comprising at least a storage device storing at least one content object accessible over a network;
implementing a security layer on a device, wherein the security layer manages encryption for the data retrieved onto the device from the cloud-based environment; and
generating encrypted content at the security layer before storing the encrypted content by:
receiving the at least one content object to be stored at the device from the cloud-based environment, and
encrypting the at least one content object with an encryption key, wherein the encrypted key is password protected; and
storing the encrypted content within an encrypted filesystem on the device;
wherein the security layer comprises a first layer that comprises an encryption client that manages authentication and secure key storage, a second layer that comprises a core set of application programming interface (API) functions that implements levels of encryption or decryption for data content, and a third layer that comprises a front-end set of APIs calls that are directly accessed by a consumer to access encrypted content.

14. The system of claim 13, further comprising storing the encrypted key within a keychain.

15. The system of claim 13, wherein the encryption key is stored in a first location and encrypted content is stored in a second location, wherein the first location and the second location are different.

16. The system of claim 13, wherein an application password or application passcode is not stored within the keychain.

17. The system of claim 13, wherein implementing the security layer on the device further comprises:
performing an authentication within a user interface at an application;
loading the encryption key into memory;

configuring delegates that correlates to a function in the third layer, wherein the delegates are configured to intercept calls that are made and to implement a callback to the functions in the security layer;

converting an unencrypted offset value into an encrypted offset value that offsets a first value within an unencrypted file into a second value within the encrypted file;

receiving, at the second layer, a request to perform an action from the third layer, wherein the request is performed with access to the encryption key;

returning a response to the request back to the function at the third layer, wherein the response corresponds to an unencrypted content; and presenting the unencrypted content.

* * * * *